US009652638B2

(12) United States Patent
Ali et al.

(10) Patent No.: US 9,652,638 B2
(45) Date of Patent: **\*May 16, 2017**

(54) UNLOCKING A STORAGE DEVICE

(71) Applicant: HEWLETT-PACKARD DEVELOPMENT COMPANY, L.P., Houston, TX (US)

(72) Inventors: Valiuddin Y. Ali, Cypress, TX (US); Lan Wang, Cypress, TX (US); James Robert Waldron, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/090,140

(22) Filed: Apr. 4, 2016

(65) Prior Publication Data

US 2016/0217304 A1    Jul. 28, 2016

Related U.S. Application Data

(63) Continuation of application No. 14/344,369, filed as application No. PCT/US2011/053587 on Sep. 28, 2011, now Pat. No. 9,342,713.

(51) Int. Cl.
*G06F 7/04* (2006.01)
*G06F 21/78* (2013.01)
*G06F 21/81* (2013.01)
*H04L 9/08* (2006.01)
*H04L 9/32* (2006.01)

(52) U.S. Cl.
CPC ............ *G06F 21/78* (2013.01); *G06F 21/81* (2013.01); *H04L 9/0869* (2013.01); *H04L 9/3242* (2013.01)

(58) Field of Classification Search
CPC ........................................................ G06F 21/62
USPC .......................................... 726/27; 713/182
See application file for complete search history.

(56) References Cited

U.S. PATENT DOCUMENTS

| 6,064,297 | A | * | 5/2000 | Odinak ................. H04L 63/068 |
| | | | | 340/12.33 |
| 7,676,666 | B2 | | 3/2010 | Lambert |
| 7,743,241 | B1 | | 6/2010 | Moore |
| 7,797,707 | B2 | | 9/2010 | Cherkasova |

(Continued)

FOREIGN PATENT DOCUMENTS

| CN | 1564981 A | 1/2005 |
| JP | 2009-048346 | 3/2009 |
| TW | 200805106 A | 1/2008 |
| TW | 200907804 | 2/2009 |
| WO | WO-2012102725 | 8/2012 |

OTHER PUBLICATIONS

Dow et al., "The Xen Hypervisor", <http://www.informit.com/articles/article.aspx?p=1187966>, Apr. 2008 (4 pages).

(Continued)

*Primary Examiner* — Christopher Brown
(74) *Attorney, Agent, or Firm* — Trop, Pruner & Hu

(57) ABSTRACT

An electronic device has a lower power state in which power to a storage device is disabled. Predetermined information stored in a memory is useable to unlock the storage device during a procedure to transition the electronic device from the lower power state to a higher power state. The predetermined information is different from a credential for use in unlocking the storage device.

20 Claims, 4 Drawing Sheets

(56) References Cited

U.S. PATENT DOCUMENTS

| | | | |
|---|---|---|---|
| 7,925,802 B2 | 4/2011 | Lauterbach | |
| 8,831,228 B1* | 9/2014 | Agrawal | H04L 9/0822 380/277 |
| 2004/0225892 A1 | 11/2004 | Bear | |
| 2004/0236919 A1* | 11/2004 | Okaue | G06F 12/1441 711/164 |
| 2006/0156035 A1 | 7/2006 | Tran et al. | |
| 2006/0200819 A1 | 9/2006 | Cherkasova | |
| 2006/0200820 A1 | 9/2006 | Cherkasova | |
| 2006/0242407 A1 | 10/2006 | Kimmel et al. | |
| 2008/0222423 A1* | 9/2008 | Rodriguez | G06F 21/31 713/182 |
| 2009/0006857 A1 | 1/2009 | Cheng | |
| 2009/0193106 A1 | 7/2009 | Bouten | |
| 2010/0115315 A1 | 5/2010 | Davis | |
| 2010/0122197 A1 | 5/2010 | Fujioka | |
| 2010/0161844 A1 | 6/2010 | Barde | |
| 2010/0199062 A1 | 8/2010 | Dominguez | |
| 2010/0205420 A1 | 8/2010 | Chen | |
| 2011/0055823 A1 | 3/2011 | Nichols | |

OTHER PUBLICATIONS http://www.trustedcomputinggroup.org, "Commonly Asked Questions and Answers on Self-Encrypting Drives", dated on or before Aug. 25, 2011 (7 pages).

International Searching Authority, International Search Report and Written Opinion, Appln No. PCT/US2011/053587, date of mailing Apr. 9, 2012, 9 p.

M'Raihi et al., "HOTP: A HMAC-Based One-Time Password Algorithm", Network Working Group, Request for Comments: 4226, Dec. 2005 (74 pages).

Perenson, "Self-Encrypted Drives Set to Become Standard Fare", <http://www.pcworld.com/article/215681/self_encrypted_hard_drives_to_become_standard_fare.html>, Jan. 2011 (4 pages).

Sanders, "Booting a VMWARE VM from CD, USB, or the Network", <http://www.virtualizationadmin.com/kbase/VirtualizationTips/GeneralVirtualizationTips/DesktopVirtualizationTips/Hardware/BootingaVMWareVMfromCDUSBortheNetwork.html>, Mar. 2011 (7 pages).

Seagate Technology, "How to Protect Data and Reduce Drive Retirement Costs", <http://www.seagate.com/files/docs/pdf/whitepaper/self-encrypting-drives-tp600.2-1103us.pdf>, 2008 (15 pages).

Wikipedia, HOTP, <http://en.wikipedia.org/wiki/HOTP>, Jul. 2011 (4 pages).

Xen, "How Does Xen Work?", <http://www-archive.xenproject.org/files/Marketing/HowDoesXenWork.pdf>, Dec. 2009 (10 pages).

* cited by examiner

UNLOCKING A STORAGE DEVICE

CROSS REFERENCE TO RELATED APPLICATIONS

This is a continuation of U.S. application Ser. No. 14/344,369, filed Mar. 12, 2014, which is a national stage application under 35 U.S.C. §371 of PCT/US2011/053587, filed Sep. 28, 2011, which are both hereby incorporated by reference in their entirety.

BACKGROUND

A storage device can include an auto-lock feature, in which removal of power from the storage device causes the storage device to become locked (such that data contained in the storage device cannot be accessed). To unlock the storage device, a credential is provided to the storage device when the storage device resumes from a powered-off state.

BRIEF DESCRIPTION OF THE DRAWINGS

Some embodiments are described with respect to the following figures.

DETAILED DESCRIPTION

Figure 1:
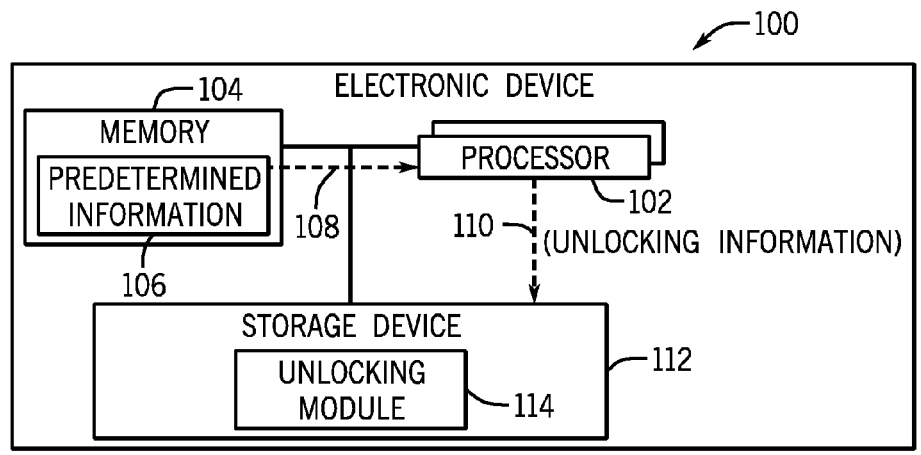
FIG. 1 is a block diagram of an example electronic device according to some implementations.

When an electronic device (e.g. a computer, a personal digital assistant, a smartphone, an electronic appliance, etc.) that includes a storage device with an auto-lock feature enters a sleep state, the electronic device may place the storage device in a powered-off state. A "sleep state" refers to a lower power state (e.g. an off state or other lower power state) of an electronic device in which power is removed from the storage device. When the electronic device resumes from the sleep state, the storage device with the auto-lock feature is powered on. As the storage device starts from the powered-off state, the storage device uses a credential to unlock itself. The "credential" can refer to a password, an authentication key, or any other secret information that is used to provide secure access of the storage device. The credential can be provided by a user, an administrator, or another source. If no credential or an incorrect credential is provided, then the storage device remains locked and data in the storage device remains inaccessible.

An example of a sleep state is the S3 state as defined by the Advanced Configuration and Power Interface (ACPI) specification. In other implementations, other types of sleep states can be employed. More generally, reference is made to a "lower power state" of an electronic device. The electronic device can transition from this lower power state to a "higher power state," which is a power state in which power is returned to the storage device. Although reference is made to a "sleep state" in the ensuing discussion, it is noted that other lower power states can be used in other examples.

In the sleep state of the electronic device, even though power is removed from the storage device with the auto-lock feature, power is maintained to a memory of the electronic device, to allow information stored in the memory to be maintained and to be used for resuming the electronic device to a previous state. During resumption from a sleep state, a boot module may be unable to prompt a user for a credential to be used for unlocking the storage device with the auto-lock feature. This is due to possible corruption of content of the memory should the boot module attempt to perform certain tasks (such as prompting for a credential for unlocking the storage device) other than predefined housekeeping tasks. Prior to entry into the sleep state, an operating system (OS) often stores a current state of the electronic device into the memory—this current state is used upon resumption from the sleep state. The current state can include state information of drivers, components (e.g. graphics component, keyboard, peripheral device, etc.), and other information. For the boot module to perform a prompt for a credential for unlocking the storage device, the boot module may have to modify the content of the memory, which can corrupt the current state information stored in the memory. Another reason that the boot module is not able to obtain a credential may be because the boot module may not have access to system resources employed to gather the credential from the user or other external entity.

In accordance with some implementations, when an electronic device resumes from a sleep state (transitions from the sleep state to a higher power state, such as the normal state of operation of the electronic device), a boot module is able to retrieve certain information from the memory to derive unlocking information that can be provided to a storage device with an auto-lock feature to allow the storage device to unlock. In this way, the boot module does not have to prompt a user to enter a credential for unlocking the storage device during resumption from the sleep state.

In some implementations, the boot module can be a Basic Input/Output System (BIOS) module. In other examples, other types of boot modules can be used. More generally, a "boot module" refers to any module that performs at least some tasks before an electronic device transitions from a lower power state to a higher power state.

In some examples, a storage device with an auto-lock feature can be a self-encrypting storage device. In a self-encrypting storage device, a data encryption key is used to protect data stored in the self-encrypting storage device. Circuitry in the self-encrypting storage device uses the data encryption key to encrypt data, such that encrypted data is stored. When the stored data is later accessed, the circuitry decrypts the encrypted data and provides the decrypted data to the requestor. If a user of the self-encrypting storage device later decides to dispose of the storage device or to erase data stored in the storage device, then the user can simply cause a command to be submitted (by the BIOS or another agent) to the self-encrypting storage device to erase the data encryption key, which effectively erases the stored data since such data would not be recoverable without the data encryption key.

Note that data delete operations available using operating system or file system based interfaces do not actually erase the underlying data on a persistent storage medium (e.g. magnetic storage medium, optical storage medium, flash memory, etc.). Even when files or directories are "deleted," the underlying data still remains on the persistent storage medium. To effectively erase the underlying data, the data may have to be overwritten, or alternatively, the persistent storage medium can be destroyed. More generally, a "persistent storage medium" refers to any storage medium that maintains data stored on the storage medium even after system power is removed from the storage medium.

Note that if the access to the encryption key inside the self-encrypting storage device is not controlled, then there will be no meaningful protection of the data in the self-encrypting storage device. The self-encrypting storage device is provided with the credential discussed above to control access to the encryption key. Various mechanisms can be used to allow access to the encryption key using the credential.

Although reference is made to self-encrypting storage devices, note that techniques or mechanisms according to some implementations can also be applied to other types of storage devices that employ an auto-lock feature.

FIG. 1 is a block diagram of an example electronic device 100. The electronic device includes a processor (or multiple processors) 102. The processor(s) 102 can be connected to a memory 104 and a storage device 112 that has an auto-lock feature. The auto-lock feature locks the storage device 112 when power is removed from the storage device 112. Subsequent unlocking of the storage device 112 is accomplished by using a credential (as discussed above).

As examples, the storage device 112 can be a persistent storage device, which is a storage device that includes a persistent storage medium. The persistent storage device 112 can be a magnetic disk drive, an optical disk drive, a flash memory, or another type of storage device. As examples, the memory 104 can be implemented with integrated circuit memory device(s), such as dynamic random access memory (DRAM) device(s), static random access memory (SRAM) device(s), flash memory device(s), or any other type of memory device.

The memory 104 stores "predetermined" information 106, which is accessible by the processor(s) 102 (under control of a boot module such as a BIOS module, for example) during resumption from a sleep state. The predetermined information 106 is stored in the memory 104 prior to the electronic device entering the sleep state. Note that in implementations where the memory 104 includes volatile memory, the memory 104 remains powered (even though the storage device 112 is powered off) to allow the predetermined information 106 to remain available for subsequent use. As further discussed above, in addition to the predetermined information 106, memory 104 can further store current state information of the electronic device 100 relating to drivers, components, and so forth. Such current state information is used to restore the state of the electronic device 100 when the electronic device 100 next resumes from the sleep state.

During a procedure in which the electronic device transitions from the sleep state to a higher power state, the processor(s) 102 can retrieve (108) the predetermined information 106 from the memory 104, and can use the predetermined information to derive unlocking information (110) that is provided to the storage device 112. An unlocking module 114 in the storage device 112 uses the unlocking information 110 to unlock the storage device 112. Such unlocking of the storage device 112 is accomplished without prompting a user for a credential to unlock the storage device 112.

By using the predetermined information 106 and unlocking information 110, unlocking of the storage device 112 during resumption from a sleep state can be accomplished without having to prompt for input of a credential. In this manner, automated unlock of the storage device 112 upon resumption from the sleep state is possible.

In some examples, the predetermined information 106 can be stored in a portion of the memory 104 that is allocated for system management mode (SMM). The electronic device 100 can enter SMM to perform certain types of tasks, such as error management, power management tasks, security tasks, and so forth. The portion of the memory 104 allocated to SMM is referred to as SMM memory. SMM is an operating mode in which execution of the operating system of the electronic device 100 is suspended.

In other implementations, the predetermined information 106 can be stored in another portion of the memory 104.

The predetermined information 106 and unlocking information 110 can differ in implementations. In some implementations, the predetermined information 106 includes a seed key (also referred to as a secret or shared secret) and a random number (or counter value). The seed key and random number (or counter value) are used to generate an encryption key—this encryption key is part of the unlocking information 110 that is provided to the storage device 112. The unlocking module 114 generates the credential for unlocking the storage device 112 based on the encryption key. For example, the unlocking module 114 can decrypt an encrypted version of the credential stored in the storage device 112 using the encryption key—the decrypted credential is then useable to unlock the storage device 112.

In alternative implementations, the predetermined information 106 can include a random number. In such implementations, the unlocking information 110 also includes the random number. Thus, in such implementations, during a procedure to transition the electronic device 100 from a sleep state to a higher power state, the random number is retrieved from the memory 104, and the processor(s) 102 send(s) the unlocking information 110 that includes the retrieved random number to the storage device 112. The unlocking module 114 in the storage device 112 produces the credential to unlock the storage device 112 based on the random number. For example, the unlocking module 114 can decrypt an encrypted version of the credential using the random number.

In other implementations, other forms of the predetermined information 106 stored in the memory 104 can be used. For enhanced security, the predetermined information 106 is different from the credential that is used to unlock the storage device 112. The portion of the memory 104 (such as the SMM memory) that stores the predetermined information 106 can be accessed by an unauthorized entity, such as malware. If the predetermined information 106 contains the credential, then unauthorized access of the credential in the memory 104 can be achieved To further enhance the protection afforded by some implementations, once the boot module unlocks the storage device when resuming from a lower power state, new predetermined information 106 (e.g. new seed key or counter value or random number) can be generated and exchanged with the storage device, which can later use the new predetermined information 106 to generate the credential to allow access to the storage device (such as to allow access of an encryption key that encrypts the data on the storage device). In this manner, even if an unauthorized entity is able to observe the predetermined information 106 stored in the memory 104, the changing nature of the predetermined information 106 can reduce the chance of previously obtained predetermined information being usable when the unauthorized entity later gains physical access to the electronic device.

Although various alternative implementations have been discussed above, note that further alternative implementations are also contemplated that use different predetermined information 106 and unlocking information 110.

Figure 2:
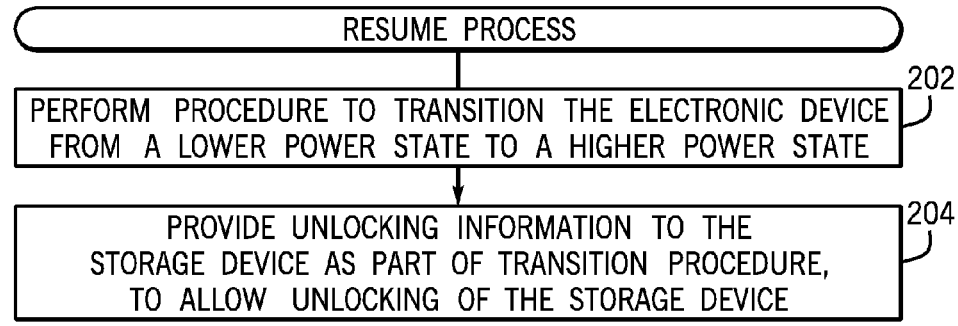
FIGS. 2-5 are flow diagrams of processes according to various implementations.

FIG. 2 is a flow diagram of a resume process of the electronic device 100, in accordance with some implementations. The process can be performed by the processor(s)

102 of FIG. 1, for example, such as under control of a boot module. The process performs (at 202) a procedure to transition the electronic device 100 from a lower power state (e.g. sleep state) to a higher power state, where power to the storage device 112 of the electronic device 100 is disabled in the lower power state The process further provides (at 204) unlocking information (110 in FIG. 1) to the storage device 112 to allow unlocking of the storage device as part of the procedure to transition the electronic device 100 from the lower power state to the higher power state, where the provided unlocking information is based on the predetermined information (106 in FIG. 1) stored in the memory 104 prior to placing the electronic device 100 in the lower power state.

Figure 3:
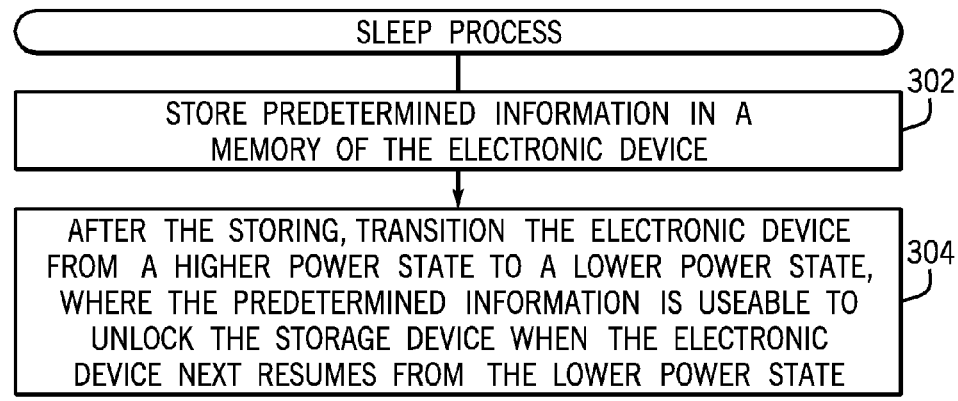

FIG. 3 is a flow diagram of a sleep process of the electronic device 100, in accordance with some implementations. The process can be performed by the processor(s) 102 of FIG. 1, for example, such as under control of a boot module. The process stores (at 302) predetermined information 106 (FIG. 1) in the memory 104 of the electronic device.

After storing the predetermined information 106 in the memory, the process transitions (at 304) the electronic device from a higher power state to a lower power state (e.g. sleep state), where power is removed from the storage device 112 when the electronic device is in the lower power state. The stored predetermined information 106 is useable to unlock the storage device 112 when the electronic device next transitions from the lower power state to the higher power state.

Figure 4:
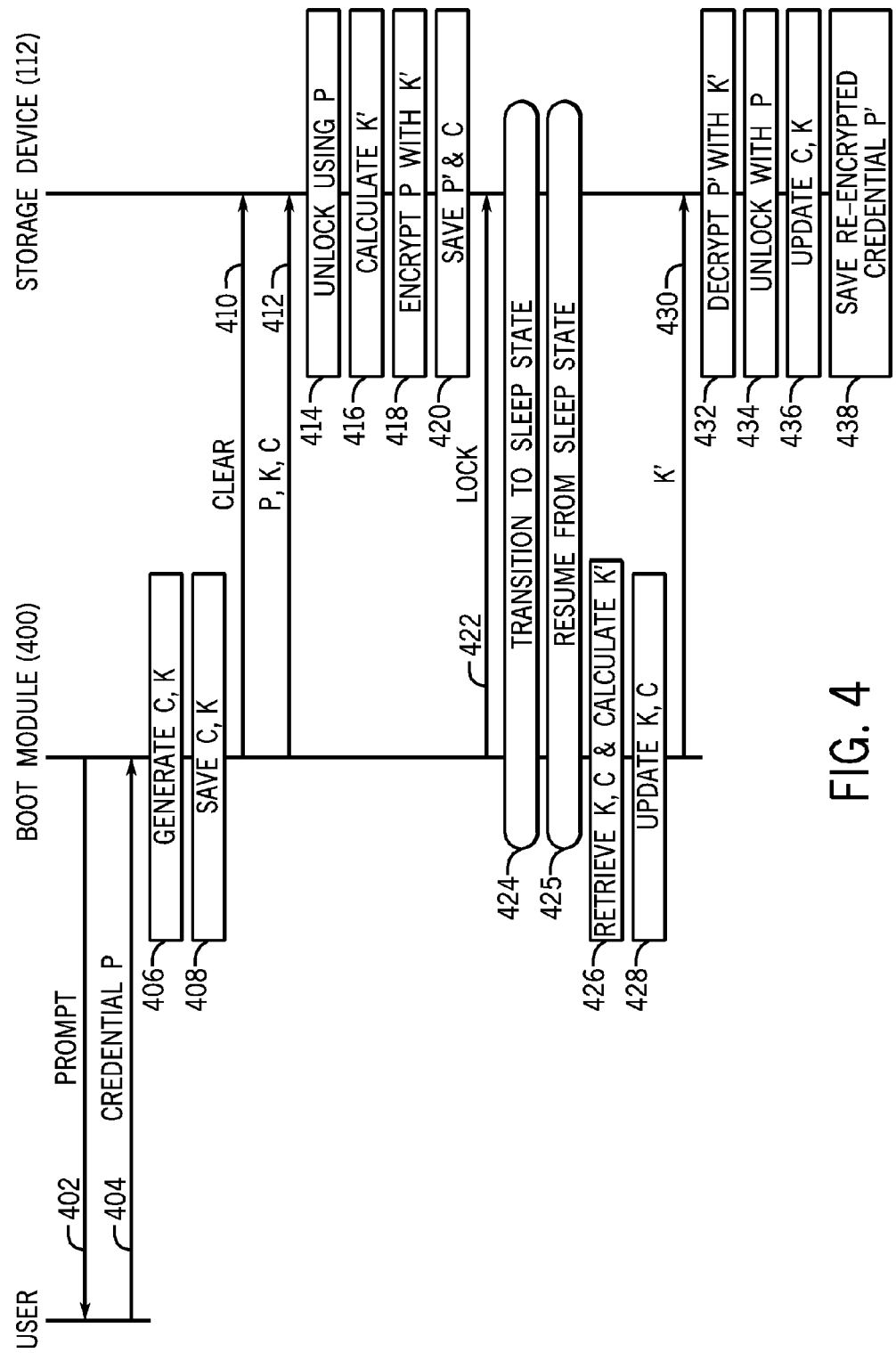

FIG. 4 is a flow diagram of a process according to alternative implementations. During a cold boot procedure, a boot module (400) prompts (at 402) a user to enter a credential for unlocking the storage device 112. The user can be located at the electronic device (in which case the prompt can be presented in a display device of the electronic device), or alternatively the user can be located at a remote device (in which case the prompt is communicated over a network to the remote device). "Cold boot" can refer to starting the electronic device 100 from a low power state or an off state in which power to components, including the memory 104 of FIG. 1, is removed. Examples of the low power state and off state include the ACPI S4 and S5 states, respectively. In other examples, other low power and off states can be used.

In response to the prompt, the user inputs the credential (referred to as "P"), which is received (at 404) by the boot module 400. Alternatively, the provision of the prompt at 402 can be performed by another module in the electronic device 100 instead of the boot module 400. Such other module can be a full volume encryption module that is responsible for obtaining a password for unlocking the storage device 112. In implementations where the credential is obtained by the full volume encryption module, the full volume encryption module can communicate this credential to the boot module 400 using one of several different types of interfaces, such as a Windows Management Interface (WMI), or an interrupt interface (e.g. INT 15h or INT 1a), or any other type of interface.

In implementations according to FIG. 4, the boot module 400 generates (at 406) a random number C as a counter, and further generates a shared secret K between the boot module 400 and the storage device 112. In some examples, the shared secret K can be an SHA-1 (secure hash algorithm-1) hash of a value that is an exclusive-OR (XOR) of the counter C with the credential P. SHA-1 is a cryptographic hash function. In some examples, an HOTP technique is used, where HOTP refers to HMAC-SHA-1 based-one-time-password, and where HMAC stands for hash-based message authentication code. Information relating to the HOTP technique can be found in Request for Comments (RFC) 4226, entitled "HOTP: An HMAC-Based One-Time Password Algorithm," dated December 2005. In other examples, other techniques for computing the secret K and random number C can be used.

According to the HOTP technique, K is referred to as a shared secret, and C is referred to as a counter. The counter C can be initialized to a random number. The shared secret K can be generated randomly. As noted above, in some examples, K is computed according to $$K=\text{SHA-1}(P \text{ XOR } C).$$

The operation P XOR C represents an exclusive-OR of P and C. The cryptographic hash function (SHA-1) produces a hash value (K) based on P XOR C. In other examples, other functions for producing K can be used.

Next, the boot module 400 saves (at 408) the shared secret K and the counter C in the SMM memory (or in some other memory portion). In the context of FIG. 1, the K and C values are part of the predetermined information 106 stored in the memory 104.

The boot module 400 then issues (at 410) a clear command to the storage device 112, to cause the storage device 112 to clear any previous information relating to unlocking the storage device 112. The boot module 400 then sends (at 412) the values P, K, and C to the storage device 112. After sending the credential P to the storage device 112, the boot module 400 deletes the credential P from the memory 104.

The received credential P is used by the storage device 112 to unlock (at 414) the storage device 112. The storage device 112 also calculates (at 416) an encryption key K' based on the K and C values received from the boot module 400, as follows:

$$K'=\text{HOTP}(K,C).$$

The foregoing operation, HOTP(K,C) can be defined as follows:

$$\text{HOTP}(K,C)=\text{Truncate}(\text{HMAC-SHA-1}(K,C)).$$

The Truncate( ) operation selects some predefined number of bytes (e.g. 4 bytes) from the 160-bit value resulted from SHA-1. In some examples, the HMAC(K, C) operation, represented by HMAC-SHA-1(K, C) above, is defined as follows:

H(•) is a cryptographic hash function,
|| denotes concatenation,
opad is the outer padding (0x5c5c5c . . . 5c5c, one-block-long hexadecimal constant), and
ipad is the inner padding (0x363636 . . . 3636, one-block-long hexadecimal constant).

Then HMAC(K, C) is mathematically defined as $$\text{HMAC}(K,C)=H((K \text{ XOR } o\text{pad})||H((K \text{ XOR } i\text{pad})||C)).$$

Although an example HOTP( ) definition is provided above, different functions for producing the encryption key K' based on K and C can be used in other examples.

The encryption key K' is then used by the storage device 112 to encrypt (at 418) the credential P to produce an encrypted credential P':

$$P'=\text{Encrypt}(P \text{ with } K').$$

The encrypted credential P' and the counter C are then saved (at 420) in the storage device 112. Note that the clear text (unencrypted) version of the credential, P, is deleted by the storage device 112.

The boot module 400 can next send (at 422) a lock command to the storage device 112. This lock command is to indicate that no further modifications of the encrypted credential P' are to be performed until after the next boot cycle (when the electronic device 100 is again in the boot environment). The lock command is effectively a write-once command to prevent modification of P' outside the boot environment (to prevent malicious entities from modifying P' to gain access to the storage device 112). By encrypting the credential P, physical attacks on the storage device 112 may yield just the encrypted credential P' (and not the clear text version of the credential P).

Also, since just K and C are stored in the memory 104, any unauthorized access of the memory 104, such as by using a memory freeze attack, would yield just the K and C information, which cannot be used by an unauthorized entity to derive the credential P. A memory freeze attack refers to an attack in which the temperature of the memory 104 is reduced to a freezing temperature such that the data loss process when power is removed from the memory 104 is slowed down. This allows an unauthorized user to remove the memory 104 from the electronic device (which causes power to be lost), followed by re-connecting the memory 104 in another system, where power is again provided to the memory 104 in an attempt to retrieve information previously stored in the memory 104. Also, the K and C values in the memory 104 are lost upon a system cold boot, which protects against replay attacks.

As further shown in FIG. 4, the electronic device 100 is next transitioned (at 424) to the sleep state.

Upon resuming (at 425) from the sleep state, the boot module 400 is initiated and performs a procedure to transition the electronic device 100 from the sleep state to a higher power state. During this transition procedure, the boot module 400 retrieves the K and C values form the memory 104, and calculates (at 426) the encryption key K' using, for example, K'=HOTP(K, C), similar to the calculation of K' at 416 in the storage device 112.

Additionally, in some examples, the boot module 400 updates (at 428) the K and C values as follows: increment the counter C, and set K=K'. The updated K and C values are to be used in the next sleep state resume cycle (after the electronic device 100 next transitions to the sleep state and then subsequently resumes from the sleep state). In other examples, updating of the K and C values is not performed. Updating the K and C values such that different K and C values are used in different resume cycles provides enhanced protection.

The boot module 400 sends (at 430) the encryption key K' to the storage device 112. In the context of FIG. 1, the encryption key K' sent at 430 is part of the unlocking information 110.

The storage device 112 uses (at 432) the encryption key K' to decrypt the encrypted credential P' that is stored in the storage device 112, to produce decrypted credential P as follows:

$$P=\text{Decrypt}(P' \text{ with } K').$$

The storage device 112 then uses (at 434) the decrypted credential P to unlock the storage device 112.

In addition, in some examples, the storage device 112 also updates (at 436) its K and C values, to synchronize with the K and C update (428) performed by the boot module 400. The update (436) is performed as follows: increment the counter C, and set K=K'. In other examples, the update of K and C is not performed.

In examples where K and C have been updated, the storage device 112 then computes HOTP(K,C) to derive K', and re-encrypts the credential P with K' to produce P'. The storage device 112 then saves (at 438) the encrypted credential, P', with the counter C.

Figure 5:
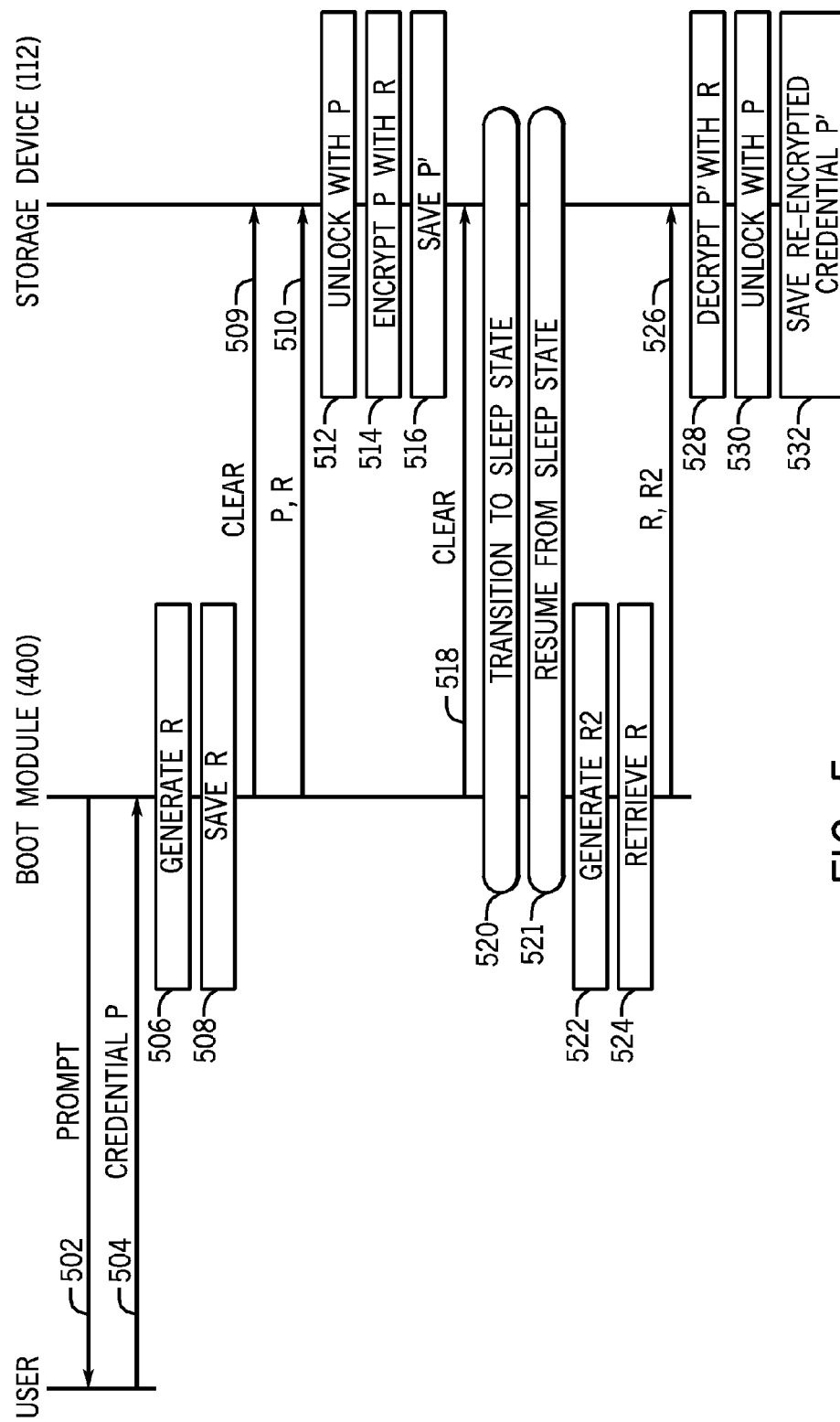

FIG. 5 is a flow diagram of a process according to further alternative implementations. During a cold boot procedure, the boot module (400) prompts (at 502) a user to enter a credential for unlocking the storage device 112. In response to the prompt, the user inputs the credential (referred to as "P"), which is received (at 504) by the boot module 400. Alternatively, the provision of the prompt at 502 can be performed by the full volume encryption module, as discussed above. The full volume encryption module can communicate the user-input credential to the boot module 400 through an interface.

Next, the boot module 400 generates (at 506) a random number, R, such as by using a pseudo-random number generator. The boot module 400 saves (at 508) the random number R in the memory 104 (FIG. 1). In the context of FIG. 1, the random number R is part of the predetermined information 106 stored in the memory 104.

The boot module 400 sends (at 509) a clear command to the storage device 112 (similar to clear command sent at 410 in FIG. 4). The boot module 400 also sends (at 510) the user-input credential, P, and the random number R to the storage device 112. After sending the credential P to the storage device 112, the boot module 400 deletes the credential P from the memory 104.

The received credential P is used by the storage device 112 to unlock (at 512) the storage device 112. The storage device 112 then encrypts (at 514) the credential P with the random number, R, to produce encrypted credential P':

$$P'=\text{Encrypt}(P \text{ with } R).$$

The encrypted credential P' is saved (at 516) in the storage device 112. Note that the storage device 112 deletes the random number R. The boot module 400 can next send (at 518) a lock command to the storage device 112 (similar to lock command sent at 422 in FIG. 4). As further shown in FIG. 5, the electronic device 100 is next transitioned (at 520) to the sleep state.

As part of resuming (at 521) from the sleep state, the boot module 400 is initiated and performs a procedure to transition the electronic device 100 from the sleep state to a higher power state. During this transition procedure, the boot module 400 generates (at 522) a new random number, R2. The boot module 400 also retrieves (at 524) the random number R previously stored to the memory 104. The random numbers R and R2 are sent (at 526) from the boot module 400 to the storage device 112. In the context of FIG. 1, the random number R at 526 is part of the unlocking information 110.

The new random number R2 is to be used in the next sleep state resume cycle. Using different random numbers in different sleep state resume cycles provides enhanced protection. In other examples, the same random number can be used in multiple sleep state resume cycles.

The storage device 112 uses (at 528) the received random number R to decrypt the encrypted credential P' that is stored in the storage device 112, to produce decrypted credential P as follows:

$$P=\text{Decrypt}(P' \text{ with } R).$$

The storage device 112 then uses (at 530) the decrypted credential P to unlock the storage device 112.

In addition, in some examples, the storage device 112 next re-encrypts the credential P with the new random number R2, also received from the boot module 400, as follows:

$$P'=\text{Encrypt}(P \text{ with } R2).$$

The new random number R2 is used to perform the decryption in the next sleep state resume cycle (this is part of the examples in which different random numbers can be used in different sleep state resume cycles). The re-encrypted credential P' (encrypted with R2) is next saved (at 532) in the storage device 112.

Using techniques or mechanisms according to some implementations, enhanced protection is provided against various forms of attacks that may seek unauthorized access of a storage device that has an auto-lock feature.

Figure 6:
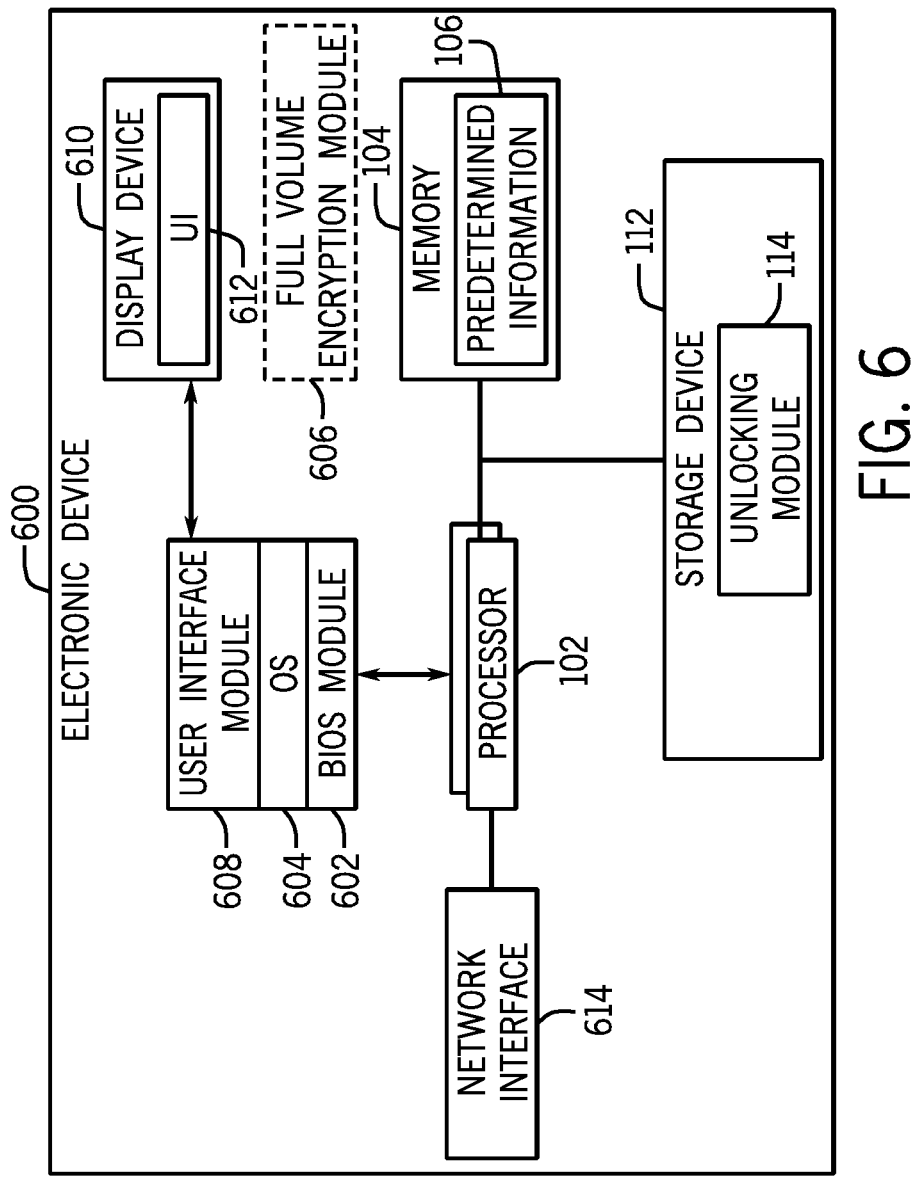
FIG. 6 is a block diagram of another example electronic device according to alternative implementations.

FIG. 6 illustrates another example electronic device 600, which includes various components. The components in the electronic device 600 that are the same as the electronic device 100 are referenced with the same reference numerals. In addition to the components already discussed in connection with FIG. 1, the electronic device 600 further includes a BIOS module 602, which can perform tasks as discussed above in connection with FIGS. 2-5. Also, the electronic device 600 includes an operating system 604. In some examples, the electronic device 600 also includes a full volume encryption module 606, discussed above in connection with FIG. 4 or 5.

A user interface module 608 in the electronic device 600 presents a user interface 612 in a display device 610. A user can enter information (such as credential P) through the user interface 612. Alternatively, the credential P can be provided by a user at a remote device, where the credential P is communicated over a network to the electronic device 600. The electronic device 600 includes a network interface 614 to communicate over such network.

The various modules discussed above (including the modules 602, 604, 608, and 608) can be implemented as machine-readable instructions that are loaded for execution on a processor or processors (e.g. 102 in FIG. 1 or 6). A processor can include a microprocessor, microcontroller, processor module or subsystem, programmable integrated circuit, programmable gate array, or another control or computing device.

Data and instructions are stored in respective storage devices, which are implemented as one or more computer-readable or machine-readable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs), or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some or all of these details. Other implementations may include modifications and variations from the details discussed above. It is intended that the appended claims cover such modifications and variations.

What is claimed is:

1. A method comprising:

performing a procedure to transition an electronic device from a lower power state to a higher power state, wherein the electronic device includes a processor, a memory, and a persistent, self-encrypting storage device, wherein power to the persistent, self-encrypting storage device is disabled in the lower power state, wherein the persistent, self-encrypting storage device is to store an encryption key to encrypt data stored on the persistent, self-encrypting storage device, and wherein the persistent, self-encrypting storage device is to use a credential to access the encryption key; and as part of the procedure to transition the electronic device from the lower power state to the higher power state:
producing unlocking information based on predetermined information stored in the memory prior to placing the electronic device in the lower power state, the predetermined information different from the credential, and
providing the unlocking information to the self-encrypting storage device, and instructing the persistent, self-encrypting storage device to decrypt an encrypted credential using said unlocking information.

2. The method of claim 1, wherein producing the unlocking information comprises generating an encryption key based on the predetermined information stored in the memory,
wherein providing the unlocking information comprises providing the generated encryption key to the storage device, wherein the generated encryption key is useable by the storage device to generate the credential to unlock the storage device.

3. The method of claim 2, wherein generating the encryption key comprises generating the encryption key based on a seed key and a counter value that were stored in the memory prior to placing the electronic device in the lower power state, where the predetermined information includes the seed key and the counter value.

4. The method of claim 3, wherein generating the encryption key comprises generating the encryption key using a HMAC (hash-based message authentication code)-based-one-time-password technique.

5. The method of claim 1, wherein producing the unlocking information comprises obtaining a random number useable by the storage device to generate the credential for unlocking the storage device, where the predetermined information includes the random number.

6. The method of claim 1, further comprising updating the predetermined information for use in producing unlocking information to be provided to the storage device in a next transition from the lower power state to the higher power state.

7. The method of claim 1, further comprising: as part of a cold boot procedure, providing a prompt to a user to enter the credential to unlock the storage device; and storing the predetermined information in the memory after obtaining the credential in response to the prompt.

8. The method of claim 7, further comprising generating a secret based on the credential, wherein the predetermined information includes the secret.

9. The method of claim 7, further comprising generating a random number after obtaining the credential, wherein the predetermined information includes the random number.

10. A non-transitory machine-readable storage medium storing instructions that upon execution cause an electronic device to:
store predetermined information in a memory of the electronic device; after storing the predetermined information in the memory, transition the electronic device from a higher power state to a lower power state, wherein power to a persistent, self-encrypting storage device is disabled when the electronic device is In the lower power state, wherein the persistent, self-encrypting storage device is to store an encryption key to encrypt data stored on the persistent, self-encrypting storage device, and wherein the persistent, self-encrypting storage device is to use a credential to access the encryption key; and
as part of resuming the electronic device from the lower power state to the higher power state: produce unlocking information based on the predetermined information stored in the memory, send the unlocking information to the persistent, self-encrypting storage device; and instruct the persistent, self-encrypting storage device to use the unlocking information to decrypt the encrypted credential.

11. The non-transitory machine-readable storage medium of claim 10, wherein the predetermined information is maintained in the memory during the lower power state.

12. The non-transitory machine-readable storage medium of claim 10, wherein the sending of the unlocking information to the storage device is to allow the storage device to generate the credential to unlock the storage device.

13. The non-transitory machine-readable storage medium of claim 10, wherein the producing and the sending are performed by a Basic Input/Output System (BIOS) module.

14. The non-transitory machine-readable storage medium of claim 10, wherein the instructions upon execution cause the electronic device to further: update the predetermined information; store the updated predetermined information in the memory for use in a subsequent procedure to transition the electronic device from the lower power state to the higher power state, to unlock the storage device.

15. An electronic device comprising:
a memory; a persistent, self-encrypting storage device having an auto-lock feature that unlocks the storage device using a credential, wherein the persistent, self-encrypting storage device is to store an encryption key to encrypt data stored on the persistent, self-encrypting storage device, and wherein the persistent, self-encrypting storage device is to use the credential to access the encryption key; and at least one processor to:
perform a procedure to transition the electronic device from a lower power state to a higher power state, wherein power to the persistent, self-encrypting storage device is disabled in the lower power state; and as part of the procedure to transition the electronic device form the lower power state to the higher power state: produce unlocking information based on predetermined information stored in a memory prior to placing the electronic device in the lower power state, the predetermined information different from the credential, provide the unlocking information to the persistent, self-encrypting storage device; and instruct the persistent, self-encrypting storage device to use the unlocking information to decrypt the encrypted credential.

16. The electronic device of claim 15, wherein the unlocking information comprises an encryption key generated based on the predetermined information stored in the memory,
wherein the generated encryption key is useable by the storage device to generate the credential to unlock the storage device.

17. The electronic device of claim 16, wherein the predetermined information includes a seed key and a counter value, and the generated encryption key is based on the seed key and the counter value.

18. The electronic device of claim 15, wherein the unlocking information comprises a random number useable by the storage device to generate the credential for unlocking the storage device, where the predetermined information includes the random number.

19. The electronic device of claim 15, wherein the at least one processor is to further: as part of a cold boot procedure, provide a prompt to a user to enter the credential to unlock the storage device; and store the predetermined information in the memory after obtaining the credential in response to the prompt.

20. The electronic device of claim 19, wherein the at least one processor is to further generating a secret based on the credential, wherein the predetermined information includes the secret.

* * * * *

UNITED STATES PATENT AND TRADEMARK OFFICE
CERTIFICATE OF CORRECTION

PATENT NO. : 9,652,638 B2
APPLICATION NO. : 15/090140
DATED : May 16, 2017
INVENTOR(S) : Valiuddin Y. Ali et al.

Page 1 of 1

It is certified that error appears in the above-identified patent and that said Letters Patent is hereby corrected as shown below:

In the Claims

In Column 11, Line 15, in Claim 10, delete "In" and insert -- in --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*